Aug. 6, 1935.  M. L. ALBRECHT ET AL  2,010,794
NUT CRACKING MACHINE
Filed May 15, 1931    5 Sheets-Sheet 1

INVENTORS
Martin L. Albrecht
Frederick W. Bachman
BY
Allen & Allen
ATTORNEYS

Aug. 6, 1935.　　M. L. ALBRECHT ET AL　　2,010,794
NUT CRACKING MACHINE
Filed May 15, 1931　　5 Sheets-Sheet 3

INVENTORS
Martin L. Albrecht
BY　Frederick to Brehmer

ATTORNEYS.

Aug. 6, 1935. M. L. ALBRECHT ET AL 2,010,794
NUT CRACKING MACHINE
Filed May 15, 1931 5 Sheets-Sheet 4

INVENTORS
Martin L. Albrecht
BY Frederick W. Brehmer
Allen F. Allen
ATTORNEYS.

Patented Aug. 6, 1935

2,010,794

UNITED STATES PATENT OFFICE 2,010,794

NUT CRACKING MACHINE

Martin L. Albrecht and Frederick W. Brehmer, Cincinnati, Ohio, assignors to The F. W. Brehmer Machine & Tool Company, Cincinnati, Ohio, a corporation of Ohio Application May 15, 1931, Serial No. 537,722

3 Claims. (Cl. 146—12)

Our invention relates to nut cracking machines for cracking nuts on a commercial scale, and particularly to machines for cracking pecans. In the art there has been some development of nut cracking machines in which nuts are fed on a conveyor to reciprocating pistons or plungers which engage the nut and crack it endwise, but as far as we are advised, such machines have not been commercially completely successful due to the great variation in the length and size of the nuts. With the great variation in the size of the nuts cracked and the difficulty of positively cracking a great number of different sized nuts, without allowing a considerable proportion of the nuts to go through uncracked, large production machines for cracking, particularly pecans, have not come into widespread use.

Pecans particularly, are cracked in two grades, one of which is with the nut partially cracked, and the other with the nut cracked so that the shell is practically released from the kernel.

Broadly, it is the object of our invention to provide a nut cracking machine which may be maintained at a high rate of operation, and which will, at the same time, satisfactorily crack practically all the nuts which pass through it.

Another object is the provision of a machine in which reciprocating plungers are provided with gripping faces which compensate for the sharp tip-like ends of the shells, so that whether the nut has a tip on it or not, it will be held between the cracking plungers and satisfactorily cracked.

Another object of our invention is the provision of a machine in which there is only one cracking chamber and in which mechanism is provided for automatically discharging the cracked nut from the cracking chamber immediately after it has been operated on.

Another object is the provision of nut cracking mechanism in which adjustments for different sized nuts and for different rates of operation may be quickly and accurately made.

Referring to the drawings, in which we have illustrated a preferred type of mechanism:—

Figure 5:
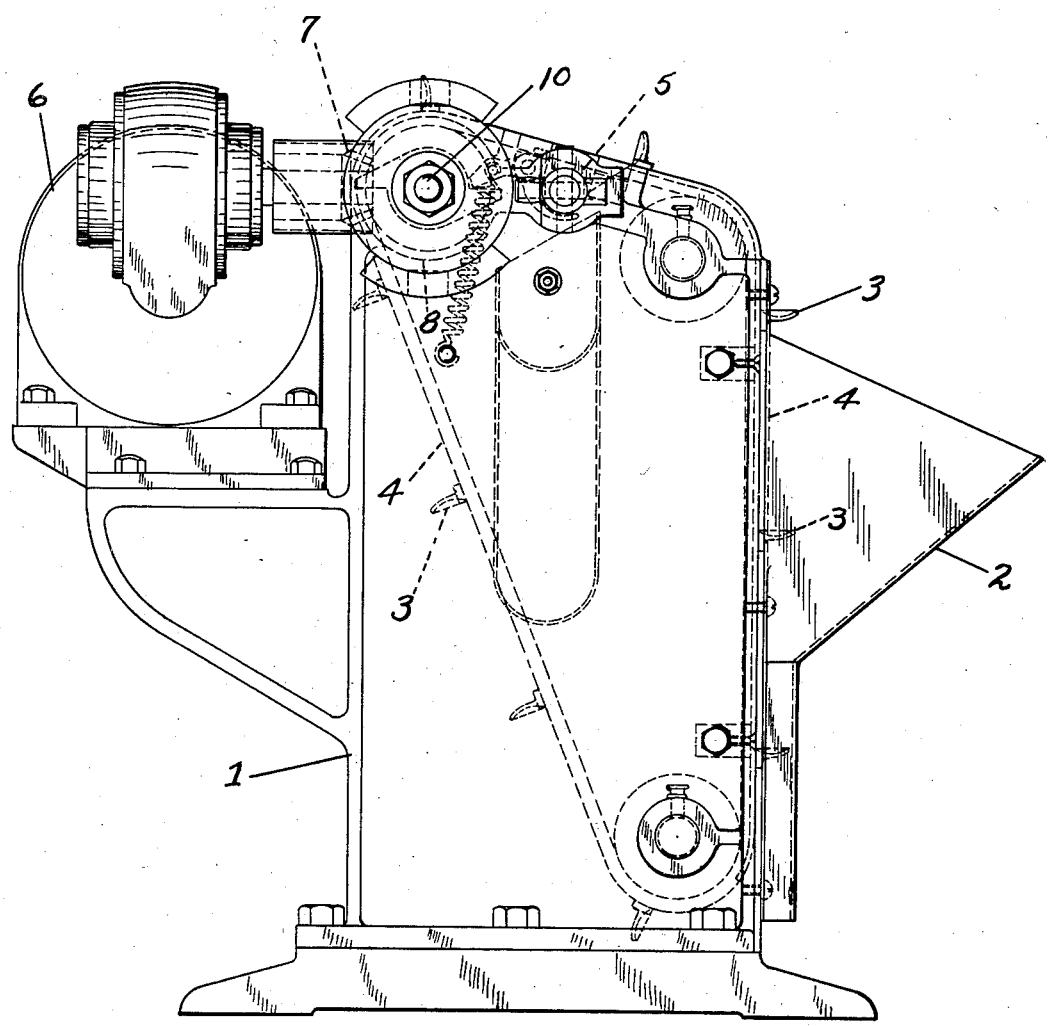
Figure 5 is a side elevation of the machine.

Referring to Figure 5, it will be noted that the machine is mounted on the usual frame work supporting members 1. There is a hopper 2 into which the nuts are placed so that they will be picked up by the buckets 3 of a link chain conveyor 4, and carried up and deposited in the cracking chamber indicated at 5.

An electric motor 6 operates through suitable pinion and worm gears 7 to drive a shaft on which are mounted sprockets 8 over which the set of the links of the chain pass.

Figure 1:
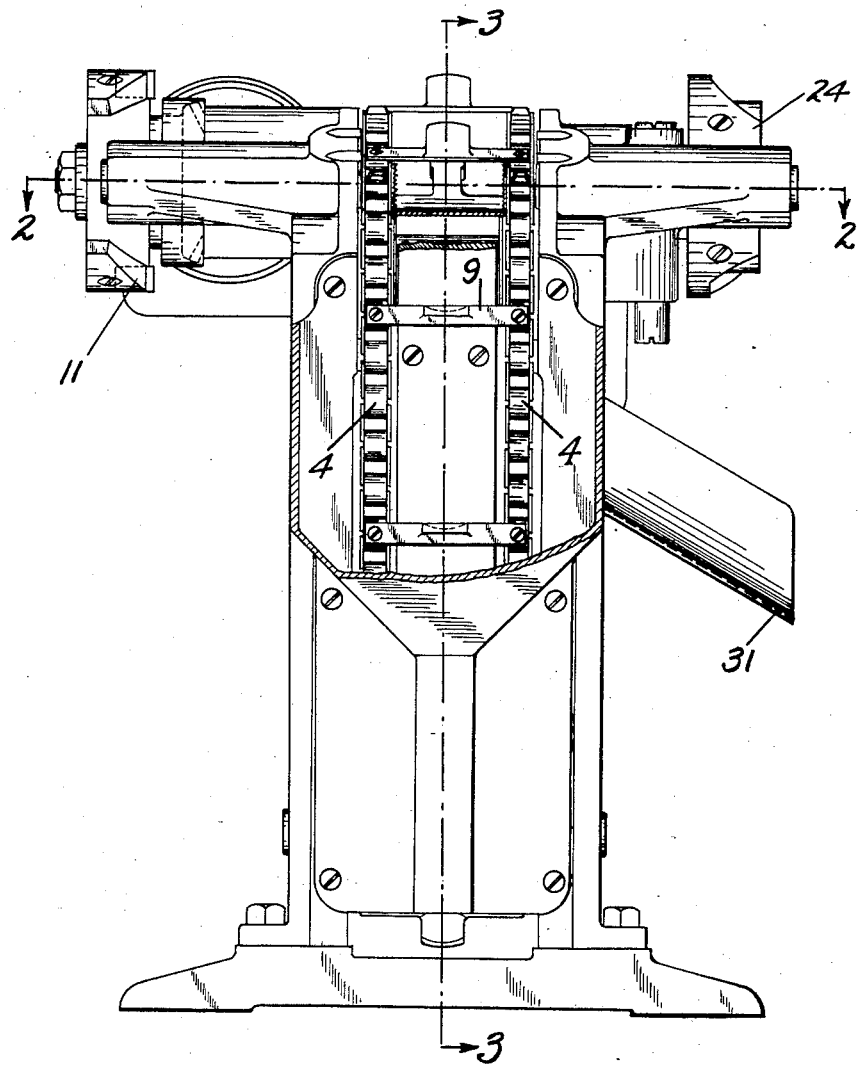
Figure 1 is a front elevation of the machine with parts broken away to reveal the internal construction of the machine.

Referring to Figure 1, there are two sets of chains, 4, which carry flights 9, from which the buckets 3 extend.

Figure 2:
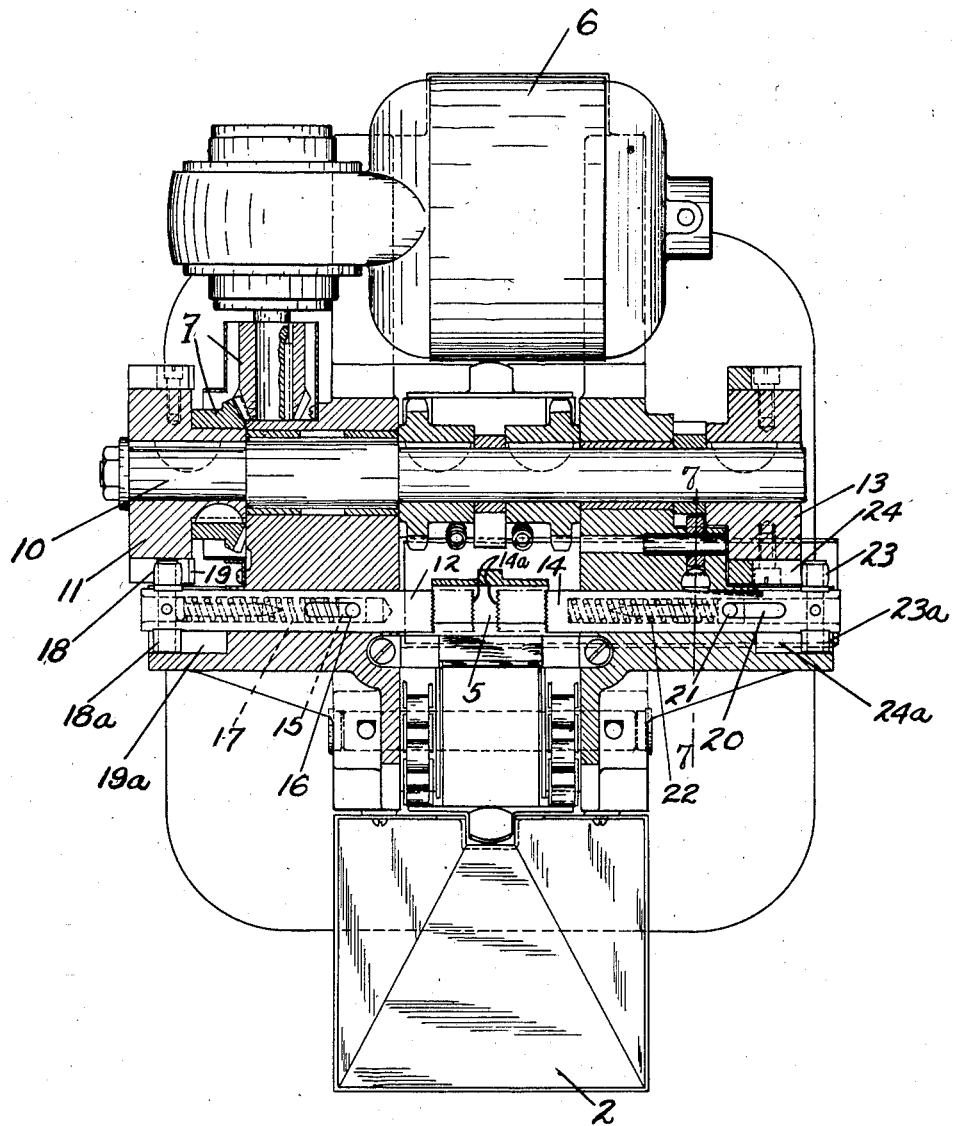
Figure 2 is a sectional view taken along the lines 2—2 in Figure 1.

The chain links as noted engage the sprockets 8 which are mounted on the shaft 10, shown in Figure 2. On one end of the shaft 10, we have shown the cam 11 which operates the mechanism for the cracking plunger 12. On the other end of the shaft 10, we have indicated the cam 13 which actuates the follower plunger 14.

The cracking plunger 12 has a slot 15 through which extends a fixed pin 16. The plunger is hollow and retains a compression spring 17, which normally presses the plunger to the left as shown in Figure 2, so that the cam rider 18, which is operatively connected to the plunger 12, is held against and rides over the face 19 of the cam 11. Another rider 18a which rides in a mechanical groove 19a in the housing prevents the plunger 12 from rotating.

The follower plunger 14 is also hollow and has a slot 20 therein through which extends a fixed pin 21, and a compression spring 22 urges the plunger 14 normally to the left as indicated in Figure 2, so that its cam rider 23, rides along the face 24 of the cam 13. The plunger 14 is held from rotation by a rider 23a which rides in a machined groove 24a in the machine housing.

It will be noted that the cracking ends of the plungers 12 and 14 are provided with roughened surfaces 14a which consists of a series of small points projecting outwardly. When a nut is cracked the tip of the nut extends down between the points and the bearing on the nut, regardless of whether or not the nut has tips at its ends, is formed by the combined surfaces of the several points. Thus, not only is allowance made for nuts which have no tips, but due to the points, the ends of the nut are grasped firmly and so have no tendency to slip diagonally and thus not be subjected to the cracking pressure of the reciprocating plungers.

Figure 3:
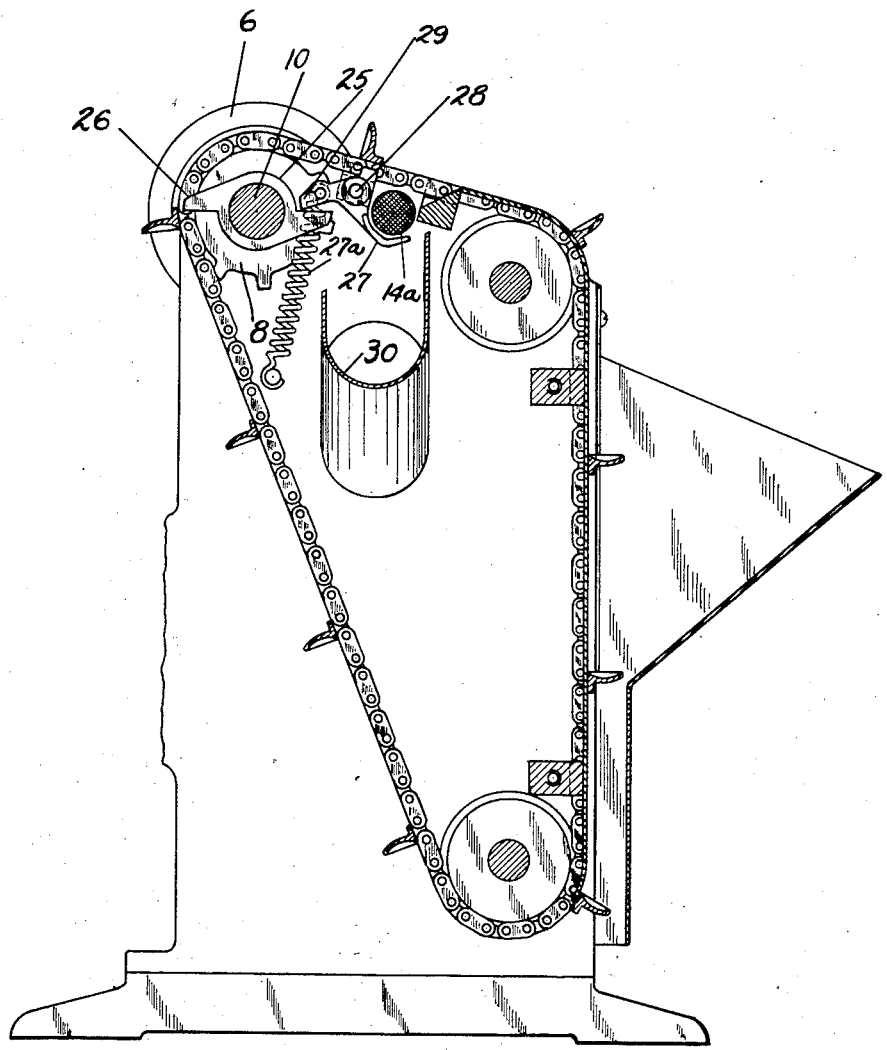
Figure 3 is a vertical, sectional view taken along the lines 3—3 in Figure 1.
Figure 6:
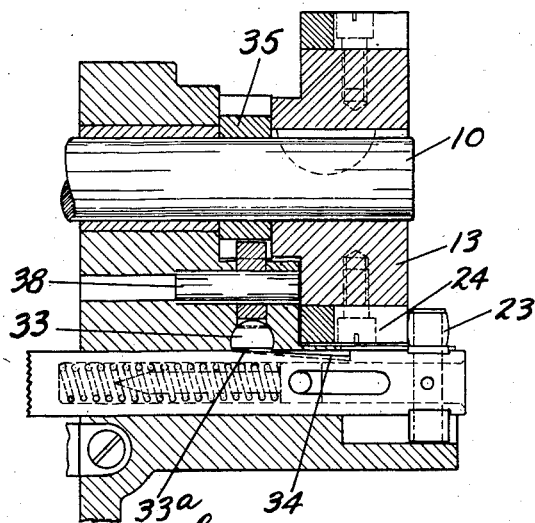
Figure 6 is an enlargement of the right hand side of Fig. 2, better showing the follower plunger and its mechanism.
Figure 7:
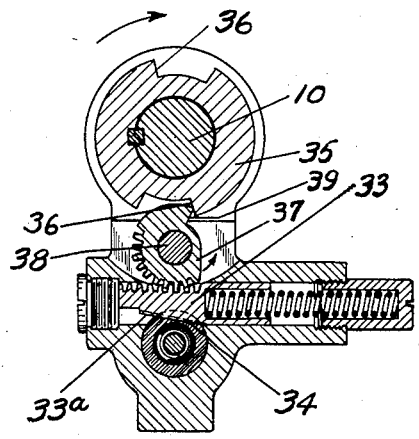
Figure 7 is a cross section on the same scale, on the line 7—7 of Figure 2 or Figure 6.
Figures 8, 9:
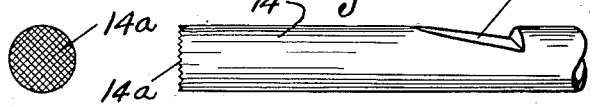
Figure 8 is an elevation of the nut engaging end of one of the plungers.
Figure 9 is a partial perspective view of the follower plunger.

Mounted on the shaft 10, we have indicated particularly in Fig. 3, the tripping device for emptying the nut from the cracking chamber after it has been cracked. On the shaft 10, there is a disc member 25 having trip lugs 26 extending therefrom. The base of the cracking chamber is provided by means of a shaped plate 27 mounted fixedly on a rotatable shaft 28. The plate 27 also has fixedly mounted thereon, a trip lug 29 which is engaged by the trip lugs 26, and at a properly timed interval after the reciprocating pistons have reached the extreme limit of movement in their cracking stroke, the plate 27 is rocked in a clockwise direction, as indicated in Figure 3, thereby allowing the nut to drop down into a chute 30, from which it is fed through a chute 31, as shown in Figure 1, into a suitable receptacle for receiving the cracked nuts. Spring 27a urges the plate 27, after it has been tripped, back to a position forming the base of the cracking chamber.

Figure 4:
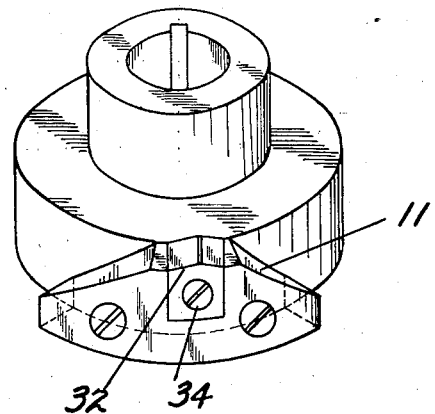
Figure 4 is a detail perspective of one type of cam adjustment for varying the cracking stroke of the cracking plungers.
Figure 4A:
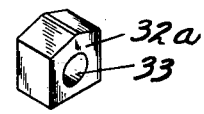
Figure 4a is a detail perspective of an adjustable cam segment.

We have indicated in Figure 4, a cam 11 having a slot in which a cam segment 32, which has a screw hole therein, may be secured to the cam 11 with a screw 34. Ordinarily we find that the cracking stroke may be accomplished by about an eighth of an inch relative movement between the plungers after the nut is securely held therein. If it is desired to increase the cracking stroke from an eighth of an inch, for example, to three-sixteenths of an inch, as is sometimes necessary, we merely remove the cam segment 32 and substitute therefor a cam segment 32a such as is indicated in Figure 4a, which has a high point which extends out a little farther than the high point on the cam segment 32. Such a fine adjustment as is noted, will often make the difference with a given run of nuts as to whether the nut is sufficiently cracked to have the shell drop substantially off or whether the shell will be merely cracked so that a further picking is required.

The nut cracking mechanism performs its cracking operation as follows:—

The nuts are fed up singly to the cracking chamber on the carrier buckets 3, and immediately after a nut is dropped into the cracking chamber, so that it rests on the V plate 27, both pistons start to move inwardly, the piston 12 being forced positively by means of its rider riding up on the cam surface of the cam 11, and the piston 14, due to the compression of the spring 22, and the riding down of its cam rider 23 on the downwardly sloping surface of the cam 13.

The pressure of the spring 22 is not sufficient to cause the follower plunger to crack the nut but is merely sufficient to hold the nut firmly endwise between the roughened surfaces 14a of the plungers. However, as the high point on the cam 11 is reached, a spring-pressed cam surfaced pin 33 is forced to such a position that its cam surface 33a binds against a correspondingly tapered cam surface 34 on one side of the plunger 14. The shaft 10 carries a notched cam disc 35 having shoulders 36 which act to engage and rotate a gear segment 37 mounted on a shaft 38 and meshing with rack teeth on the pin 33. The segment 37 has a trip lug 39 which is engaged twice during each rotation of the shaft 10 by a shoulder 36. The disc 35 is keyed on the shaft 10 so as to rock the gear segment 37 and cause the pin 33 to be moved back against the compression of the spring excepting when the cracking plunger is to make its stroke, when, at the cracking interval, the lug 39 drops into one of the notches on the disc 35 when the spring pressing the pin 33 causes it to bind against the plunger 34 causing it to remain stationary until the nut is cracked.

When the plunger 33 is released, and holds the plunger 14 immovable, the plunger 12 advances the balance of its cracking stroke, which, as has been noted, may be varied by changing the high spots on the cam employed. As soon as the cam rider 13 starts to ride down the cam surface, the gear segment 37 returns the pin 33 out of blocking position and the plunger 14 is brought back out of the cracking chamber, because being free to be retracted, its cam rider 23 starts to ride up the surface of the cam 13. The locking mechanism will be effective regardless of the distance which the plunger 14 advances, as will be apparent.

As soon as both plungers have backed out from the cracking chamber, the V plate 27 is tripped and the nut drops down into the chute 30.

We prefer to provide a motor with a worm wheel drive, and in order to change the speed, a different motor may be provided, or we may use a variable speed motor.

Thus, for display purposes, it may be desirable to operate the machine at, for example, sixty strokes per minute, whereas in actual production work, it may be desirable to increase the speed to one hundred and twenty strokes per minute.

While we have shown a conveyor feed for conveying the nut singly to the cracking chamber, other types of feed in which the nuts are fed to such chamber may be employed, without departing from the principle of our invention.

Having thus described our invention, what we claim as new and desire to secure by Letters Patent, is:—

1. In a nut cracking machine having a chamber, nut cracking members having an approaching relative movement and a recessive relative movement in said chamber, means yieldingly causing the approaching movement of one member, a cam causing the recessive movement of said one member, a cam causing the approaching movement of the other member, a member yieldingly pressed to the one member to hold said one member in its approached position, having a wedging engagement with said one member, a cam to withdraw said holding member from its wedging engagement, all of said cams being on a common axis parallel with the line of movement of the nut cracking members, an element rotating co-axially with said cams, and a conveyer running around said element and across the top of said chamber, dropping nuts into said chamber, said cams co-ordinating the movement of said conveyer and the movements of the nut cracking members and the holding member, whereby the one member is positively held as the other nut cracking member approaches it to crack a nut, and is released as said other member recedes, and the conveyor drops a nut while the nut cracking members are receded from each other.

2. In a nut cracking machine, a cracking member and a follower member yieldingly pressed toward the cracking member, the cracking member being positively pressed toward the follower member, and a holder for the follower member, yieldingly pressed thereto, the contacting surfaces of the follower member and the holder being inclined to the direction of pressure and the direction of pressure being at a substantial angle to the direction of pressure of the cracking member, whereby a self-adjusting wedging action is produced to hold the follower member resistant to the pressure of the cracking member, means to cause pressure and recession of the cracking member, means to cause recession of the follower member as the cracking member recedes, and means to withdraw the holding member to permit the recession of the follower member.

3. In a nut cracking machine comprising a cracking member and a follower member yieldingly pressing the nut toward the cracking member, mechanism to cause cracking pressure by the cracking member and a following recession of the follower member, said follower member having a surface inclined to its line of movement and facing in the direction of its recession, a holding member yieldingly pressed across said line of movement and having a surface inclined to its line of movement and facing in the direction of pressing, and wedged against the inclined surface of the follower member when said follower member is in nut-pressing position, and means whereby said mechanism withdraws said holding member from its wedging position to permit the recession of the follower member from said nut-pressing position.

MARTIN L. ALBRECHT.
FREDERICK W. BREHMER.